Aug. 16, 1960

H. W. KATZ 2,949,585

DELAY LINE FOR ANGULAR MODULATION

Filed May 1, 1958

INVENTOR:
HAROLD W. KATZ,

BY Robert J. Mooney
HIS ATTORNEY.

2,949,585

DELAY LINE FOR ANGULAR MODULATION

Harold W. Katz, Syracuse, N.Y., assignor to General Electric Company, a corporation of New York Filed May 1, 1958, Ser. No. 732,310

13 Claims. (Cl. 332—29)

This invention relates to variable delay lines and more particularly to phase modulators employing such delay lines. The invention has special suitability to devices for direct angular modulation of carrier signals having a frequency up to 30–40 megacycles per second.

One object of the invention is to provide a variable delay line affording a large amount of change in delay at high frequencies, e.g. plus or minus 720 degrees at 30 megacycles, yet occupying a small volume.

Another object is to provide an improved electrically variable delay line affording an enlarged time delay per unit physical length, together with a substantially constant delay per unit length over an enlarged frequency range.

Another object is to provide a phase modulator including an electrically variable delay line which is particularly suitable for operation with low losses over a wide frequency range up to frequencies of the order of tens of megacycles and higher.

Another object is to provide a variable delay line of the foregoing character having a minimum phase distortion with frequency.

Another object is to provide a phase modulator of the foregoing character which requires very little modulation power.

Another object is to provide a phase modulator of compact and small size which is mechanically sturdy and eliminates the need for frequency multipliers heretofore required with reactance tube devices.

These and other objects will be apparent from the following description taken in conjunction with the accompanying drawings, where:

Figure 1:
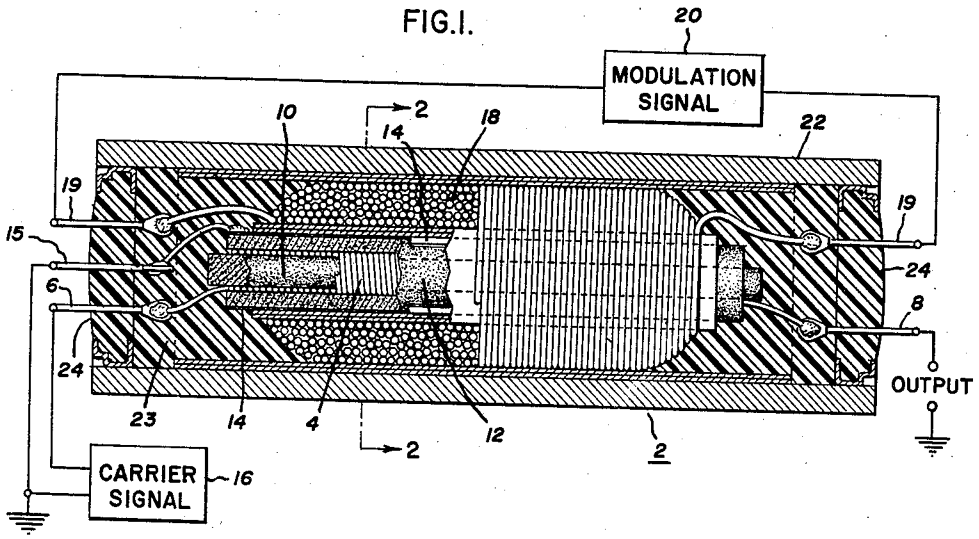
Fig. 1 is a diagrammatic view, partly broken away in axial section, of a delay line modulator constructed according to my invention.
Figure 2:
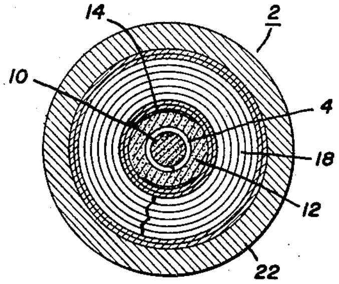
Fig. 2 is a transverse sectional view of a portion of the structure of Fig. 1, taken on the line 2—2 thereof.

Figure 1 shows a phase modulator including a variable delay line 2 constructed according to my invention. The distributed inductance of the delay line 2 is provided by a helical signal winding 4, to one end of which the signal to be delayed or modulated is adapted to be applied through a lead 6 and from the other end of which the delayed or modulated signal is recoverable through a lead 8. The signal winding is wound on a core formed by a rod 10 of nonconductive ferromagnetic easily-saturable high permeability ferrite material, the term "ferrite" being defined as a crystalline reaction product of iron oxide and one or more oxides of bivalent metal, chemically combined to form a single homogeneous polycrystalline compound. By "easily saturable" is meant that the small signal permeability of the ferromagnetic material can be varied smoothly over a wide range by the application of small magnetizing forces of the order of a few oersteds.

To sustain maximum inductivity for the line at high frequencies up to 30–40 mc. per second, and hence enhance the ability of the line to provide large amounts of delay per unit length at such high frequencies, the rod and signal winding are enclosed within a closely fitting tube 12 of ferrite. To obtain the maximum bandwidth at the highest frequency range of operation, the air gap between the rod and tube should preferably be a minimum, and should not exceed 20% of the rod diameter. The distributed capacitances of the delay line are provided by the plurality of capacitive couplings between the signal winding and a ground plane 14 which consists of one or more conductors supported adjacent, but in dielectrically spaced relation to the signal winding and connected to an external lead 15. The ground plane conductors may consist for example of one or more strips or a single unified coating of conductive material extending along and supported on the exterior surface of the ferrite tube 12, in which case the tube itself may serve as the princpal dielectric for the capacitors formed by the ground plane conductors and the signal winding.

Phase modulation or other change in effective delay of a carrier wave or other signal applied from a source 16 to the signal winding 4 is effected by producing a variable degree of magnetic saturation of the tube, or tube and rod. This varies the permeability of the tube or tube and rod, thus varying the inductance of the line and its instantaneous delay, since, as is known in the art, the delay of the line per unit physical length is proportional to $\sqrt{LC}$, where L is the inductance per unit length and C is the capacitance per unit length. To produce the desired variation in permeability, means is provided for developing a magnetic field of variable intensity for saturating the tube, or tube and rod, to the desired degree. Preferably such means takes the form of a modulation or magnetizing winding 18 wound on the exterior surface of the tube and electrically insulated therefrom. The modulation winding is adapted to be connected through leads 19 to any suitable source of modulating signals 20, which signals may be alternating or direct current or a combination of both.

The foregoing construction has the advantage that the ferrite tube, while being easily saturable, for example by a magnetizing force of the order of ten oersteds or less, contributes greatly to the prevention of decay in inductance of the line at the higher frequencies where the currents in the various turns of the signal winding 4 are not all in phase. This is important, particularly for phase modulator applications, where the maximum available delay is desired in order to provide the greatest possible range of variation in delay. The effect of tube 12 may be explained as follows: when the frequency of the signals applied to winding 4 becomes high enough so that an appreciable phase difference occurs between the currents in the various turns of winding 4, then the flux lines of the magnetic field produced by winding 4 will not remain concentrated in rod 10 as they do at lower frequencies. Instead the flux lines will form closed paths looping outside the rod 10 at intervals along rod 10. The presence of tube 12 immediately adjacent the exterior of rod 10, and separated from the rod 10 substantially only by the thickness of winding 4, provides a high permeability path for those portions of the flux lines outside rod 10, and thereby offsets the decay in inductance, and total delay, of the line which would otherwise occur at the higher frequencies.

Further to reduce the effect of the out-of-phase current components which occur in the signal winding at the higher frequencies, as well as to reduce the amount of power required for the modulation signal, the diameter of rod 10 and the wall thickness of tube 12 should be made as small as is reasonably practical. Preferably the ratio of the length of the rod 10 and tube 12 to the outside diameter of the tube 12 should be not less than 10 to 1 to minimize the modulation drive current. This ratio of length to diameter also minimizes the effect of variances in the impedance of the line adjacent the ends of the rod and tube.

The structure above described may be enclosed within a suitable case or container 22, filled with a suitable potting compound 23, and closed at its ends by suitable seals 24 preventing the entrance of moisture, dust, and the like, and through which may be brought out the external leads 6, 8, 15, 19 connected to the signal and modulation windings and ground plane.

With the construction provided according to the invention, the turns of the signal winding 4 are not only capacitively coupled individually to the ground plane 14, but through the ground plane the various turns of the signal winding are capacitively coupled to each other. This latter coupling tends to offset the decrease in effective inductance of the delay line at the higher frequencies where currents in the various turns of the signal winding may become considerably out of phase with each other. Accordingly the capacitive coupling afforded between signal winding turns by the ground plane further offsets decay in inductance with frequency, and further reduces any tendency to decrease in delay of the line per unit length with frequency.

In addition to the foregoing general structural features, in order to minimize losses as well as provide the substantial amounts of change in delay required for effective phase modulation at the higher frequencies of interest, namely up to 30–40 megacycles per second, the ferrite rod 10 and tube 12 must also have certain critical characteristics. To achieve sufficient delay, and sufficient range of variation in delay, for practical utility of the line as a phase modulator, the initial permeability of both rod 10 and tube 12 must be not less than about 40 and also preferably the permeability of the rod should not exceed approximately 200. Also when the ferrite tube 12 serves as the principal dielectric between the ground plane and signal winding, the ferrite of the tube should have a dielectric constant of not less than 10. To keep losses within practical limits the quality factor of the ferrite rod and tube should be not less than 50 in the desired operating frequency range. Moreover to achieve maximum benefit from the tube 12 over as broad a frequency range as possible the permeability of the tube should be as high as possible. Preferably a ferrite is desired having a gradually changing slope rather than a sharp "knee" for its B (flux) H (magnetizing force) curve in order to afford optimum linearity of variation in delay over a wide range of variation in strength of the saturating field produced by winding 18.

A delay line modulator constructed according to the invention also has the additional advantage that the modulation winding inherently provides the de-emphasis of the higher modulation frequencies desirable for proper conversion of phase to frequency modulation. That is, particularly when fed from a low impedance source, the inductive reactance of the modulation winding presents a higher impedance to modulation currents of higher frequency than to those of lower frequency. This eliminates the need for a separate de-emphasis network heretofore required in prior art frequency modulation devices. Thus, phase modulation is preferably obtained by driving the modulation winding from a constant current source, while frequency modulation is preferably obtained by driving the modulation winding from a constant voltage source.

By way of example of a construction according to the invention, a variable delay line for phase modulation and the like was constructed having a signal winding 4 consisting of 820 turns of 44 gauge insulated wire wound closely in a single layer on a ferrite rod of 2 inch length and .076 inch outside diameter. This structure was enclosed within a closely fitting ferrite tube 12 of 2 inch length having .083 inch inside diameter and .122 inch outside diameter and on the external surface of which was provided a conductive coating of silver. The ferrite used was a nickel zinc ferrite having an initial permeability of 100 to 120, and a quality factor greater than 80. The ferrite composition was approximately 30 mol percent nickel oxide NiO, 20 mol percent zinc oxide ZnO and 50 mol percent iron oxide $Fe_2O_3$. The modulation winding consisted of a coil of 5000 random progressive turns of 36 gauge insulated wire having a length of 2 inches, inside diameter of 0.13 inch and an outside diameter of .360 inch. The exemplary structure above described was enclosed in a container of phenolic impregnated paper tubing, filled with a suitable potting resin such as epoxy, and closed at its ends by glass headers sealed to the extending leads. Delays of the order of 0.2 microsecond per inch can be achieved with such a line at frequencies in the range of 30 megacycles, with an available change in time delay amounting to phase shifts of plus or minus 720° degrees.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States is:

1. An electrical transmission line having a variable delay characteristic comprising a rod of easily magnetically saturable ferromagnetic material, a signal winding on the rod adapted to be supplied with an electromagnetic wave signal to be delayed, a tube of easily magnetically saturable ferromagnetic material surrounding the rod and signal winding, a ground conductor supported in capacitively coupled relation with the signal winding, and means for varying the degree of manetic saturation of said tube and rod comprising a magnetizing winding wound so as to provide a magnetizing field which is longitudinal to the tube and rod.

2. A variable delay line as defined in claim 1 wherein the initial magnetic permeability of said rod is between 40 and 200 times that of air and the initial magnetic permeability of said tube is not less than 40 times that of air.

3. A variable delay line as defined in claim 1 wherein the ground plane is disposed adjacent the exterior surface of the tube, and the ferromagnetic material of the tube has a dielectric constant of not less than ten times that of air.

4. A variable delay line as defined in claim 1 wherein the quality factor of the ferromagnetic material of the rod and tube is not less than 50.

5. An electrical transmission line having a variable delay characteristic comprising a ferrite rod, a signal winding on the rod, a ferrite tube surrounding the rod and signal winding, a ground conductor disposed in capacitively coupled relation with the signal winding, and means far varying the degree of magnetic saturation of said tube and rod comprising a magnetizing winding wound so as to provide a magnetizing field which is longitudinal to the tube and rod.

6. A variable delay line comprising a ferrite rod, a signal winding on the rod adapted to be supplied with a signal to be delayed, a ferrite tube enclosing the rod and signal winding, the ratio of the length of said tube to its outside diameter being not less than ten to one, an electrically conductive ground plane supported in capacitively coupled relation with the signal winding, and means for varying the degree of magnetic saturation of said tube and rod comprising a magnetizing winding wound so as to provide a magnetizing field which is longitudinal to the tube and rod.

7. A variable delay line comprising a rod of easily magnetically saturable ferromagnetic material having an initial permeability of not less than 40 and a quality factor of not less than 50, a signal winding on said rod, a tube of easily saturable ferromagnetic material enclosing said rod and signal winding and having an initial permeability not less than 40 and a quality factor of not less than 50, a ground conductor mounted in capacitively coupled relation with said signal winding, and means for varying the degree of magnetic saturation of said tube and rod comprising a magnetizing winding wound on the exterior surface of the tube.

8. A variable delay line as defined in claim 7 wherein said ferromagnetic tube and rod are composed of a material the magnetic saturability of which is such that it can be substantially completely saturated by an applied magnetizing force of not over 10 oersteds.

9. A phase modulator comprising a rod of easily magnetically saturable ferromagnetic material having an initial permeability not less than 40 and a quality factor not less than 50, a helical signal winding on said rod, a tube of easily magnetically saturable ferromagnetic material having an initial permeability not less than 40 and a quality factor of not less than 50 surrounding said rod and signal winding and closely fitting therearound, a ground conductor supported by one of said ferromagnetic members, a source of carrier signals connected between one end of said signal winding and said ground conductor, and modulating means for varying the magnetic saturation of said tube and rod comprising a magnetizing winding wound on the exterior surface of the tube.

10. A phase modulator as defined in claim 9 wherein the ratio of the length of said tube to its outside diameter is not less than ten to one.

11. A phase modulator as defined in claim 9 wherein the ferromagnetic material of said rod and tube can be substantially completely saturated by a magnetizing force of not over ten oersteds.

12. In a system for phase modulating a carrier oscillation in accordance with a modulating signal, a distributed constant transmission line for imposing a variable phase delay on the carrier oscillation comprising an easily magnetically saturable ferrite rod, a helical signal winding on the rod, an easily magnetically saturable ferrite tube enclosing the rod and signal winding, a ground conductor supported in capacitively coupled relation with said signal winding, means for applying said carrier oscillation between said ground conductor and one end of said helical signal winding, a modulation winding wound on the exterior surface of the tube, means for passing through said modulation winding a current having a magnitude varying in accordance with said modulation signal to effect corresponding variation in the degree of magnetic saturation of said rod and tube and in the delay characteristic of said transmission line, and means for recovering the phase delay modulated carrier oscillation between said ground conductor and the other end of said helical signal winding.

13. An electrical transmission line having a variable delay characteristic comprising a rod of ferromagnetic material having a magnetic saturability such that its magnetic permeability can be varied by a factor of from 5:1 to 10:1 with a variation in applied magnetizing force of a few oersteds, a signal winding on the rod adapted to be supplied with a signal to be delayed, a tube of ferromagnetic material surrounding the rod and signal winding and having a magnetic saturability such that its magnetic permeability can be varied by a factor of from 5:1 to 10:1 with a variation in applied magnetizing force of a few oersteds, a ground conductor supported in capacitively coupled relation with the signal winding, and means for applying a magnetizing force to said tube and rod comprising a magnetizing winding wound on the exterior surface of the tube.

References Cited in the file of this patent

UNITED STATES PATENTS

| | | |
|---|---|---|
| 2,026,758 | Turner | Jan. 7, 1936 |
| 2,619,537 | Kihn | Nov. 25, 1952 |
| 2,650,350 | Heath | Aug. 25, 1953 |